HALL GENERATOR MAGNETIC STRUCTURE

Filed April 13, 1966

United States Patent Office 3,373,391
Patented Mar. 12, 1968

3,373,391

HALL GENERATOR MAGNETIC STRUCTURE

Peter Böhm and Karl Maaz, Nuremberg, Germany, assignors to Siemens Aktiengesellschaft, Munich, Germany, a corporation of Germany Filed Apr. 13, 1966, Ser. No. 542,408
Claims priority, application Germany, Apr. 23, 1965, S 96,709
9 Claims. (Cl. 338—32)

ABSTRACT OF THE DISCLOSURE

A Hall device is positioned on a carrier plate of ferrite material. A spacer frame of non-magnetic material which is a poor conductor of electricity is affixed to the carrier plate in space relation with the Hall device. A bridge member of ferromagnetic material is supported by the spacer frame in operative proximity with, but spaced by an air gap from, the conductor plate and functions to concentrate magnetic flux upon a surface of the conductor plate which is most effective for the Hall effect.

The present invention relates to a magnetic structure for a galvanomagnetic resistor. More particularly, the invention relates to a Hall generator magnetic structure.

A Hall generator, which is a galvanomagnetic resistor, is disclosed in German Patent No. 1,098,581 and comprises a plate of semiconductor compound of high carrier mobility provided with current supply and Hall voltage electrodes and leads connected to said electrodes. The semiconductor plate, electrodes and leads are embedded between two bodies of sintered ceramic, high ohmic, ferromagnetic material having a thermal coefficient of expansion which is substantially equal to that of the semiconductor compound. A spacer frame is positioned between the ceramic bodies and has a thickness which is at least equal to the combined thicknesses of the semiconductor plate and the electrodes provided thereon. The space between the ceramic bodies is filled with a heat conducting substance.

A similar arrangement is disclosed in German Patent No. 1,126,005, in which the space between the ceramic bodies in the area of the semiconductor plate which does not include the electrodes is filled with a ferromagnetic material which does not conduct electricity.

The flux sensitivity of a Hall device varies inversely with its magnetic reluctance in directions perpendicular to the semiconductor plate. Thus, the smaller the magnetic reluctance, the greater the flux sensitivity and the greater the amount of flux concentration on the semiconductor plate in its area between the electrodes. In the aforedescribed arrangements, the ferromagnetic material is cemented in direct contact with and as close as possible to the semiconductor plate. If the semiconductor plate is very thin, thermal and mechanical stresses impair the semiconductor plate and create an unstable zero component in the Hall device.

The principal object of the present invention is to provide a new and improved Hall generator magnetic structure. The Hall generator magnetic structure of the present invention prevents the occurrence of thermal and mechanical stresses, protects the semiconductor plate from impairment and provides a stable zero component.

In accordance with the present invention, a Hall device magnetic structure comprises a Hall device positioned on a carrier plate of ferrite material. The Hall device has a semiconductor plate of high carrier mobility, current supply electrodes provided on the semiconductor plate and Hall voltage electrodes positioned on the semiconductor plate. A spacer frame of non-magnetic material which is a poor conductor of electricity is affixed to the carrier plate in spaced relation with the Hall device. A bridge member of ferromagnetic material is supported by the spacer frame in operative proximity with, but spaced from, the semiconductor plate for concentrating magnetic flux upon a surface of the semiconductor plate which is most effective for the Hall effect. The bridge member is a ferrite and the spacer frame is a sintered ceramic. A cover plate of ferrite material may be utilized and positioned on the spacer frame to completely cover the bridge member.

In order that the present invention may be readily carried into effect, it will now be described with reference to the accompanying drawing, wherein.

Figure 1:
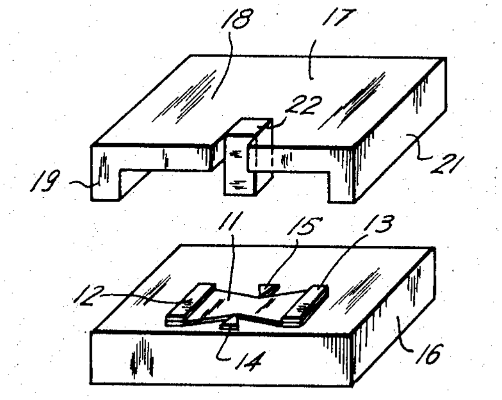
FIG. 1 is a perspective view of an embodiment of the Hall generator magnetic structure of the present invention with the spacer frame shown spaced from the carrier plate.
Figure 3:
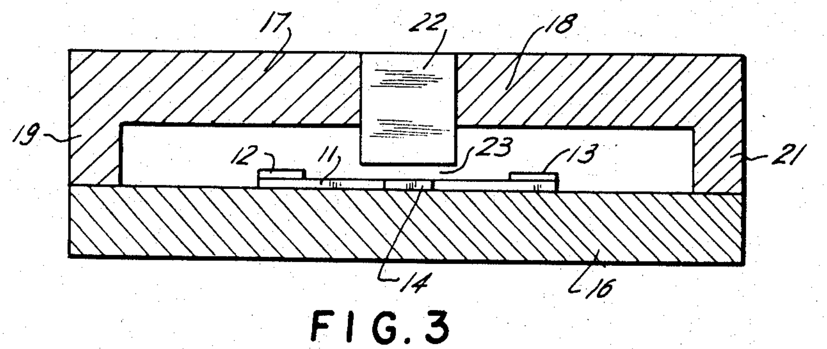
FIG. 3 is a side view, partly in section, of the embodiment of FIG. 1 in its assembled form.

In FIGS. 1 and 3, a Hall device comprises a semiconductor plate 11 which comprises a semiconductor compound of high carrier mobility provided with current supply electrodes 12 and 13 and with Hall voltage electrodes 14 and 15. The leads connected to the electrodes are not shown in order to maintain the clarity of illustration. The semiconductor plate or Hall plate 11 is positioned on a carrier plate 16 of sintered ceramic ferrite having high magnetic permeability. The current supply electrodes 12 and 13 are provided at the opposite shorter edges or sides of the Hall plate 11 and the Hall voltage electrodes 14 and 15 are provided at the opposite longer edges or sides of said Hall plate. The Hall plate 11 is positioned in parallel planar relationship with the carrier plate 16.

A substantially U-shaped spacer frame 17 having a base portion 18 and spaced, opposite, substantially parallel arm portions 19 and 21 substantially perpendicular to said base portion is positioned on the carrier plate 16, as shown in FIG. 3, with said base portion in parallel planar relationship with said carrier plate and with said arm portions affixed to said carrier plate. The spacer frame 17 comprises non-magnetic material such as, for example, a sintered ceramic such as aluminum oxide or $Al_2O_3$, which is a poor conductor of electricity. The spacer frame 17 is spaced from the Hall device, with its base portion 18 and each of its arm portions 19 and 21 spaced from said Hall device.

A bridge member 22 of ferromagnetic material, such as ceramic ferrite, is supported by the spacer frame 17. The bridge member 22 may be supported by the spacer frame 17 in a notch, groove or aperture formed in the base portion 18 of said spacer frame for such purpose, as shown in the figures. The bridge member 22 is preferably affixed to the spacer frame 17. The bridge member 22 may comprise, for example, spinel-type sintered material.

In accordance with the present invention, the bridge member 22 is supported by the spacer frame 17 in operative proximity with, but spaced from, the Hall plate 11. The bridge member 22 functions to concentrate the magnetic flux within which the structure is positioned upon the surface of the semiconductor plate 11 which is most effective for the Hall effect. The spacing of the bridge member 22 from the semiconductor plate 11 provides an air gap 23 (FIG. 3) therebetween of approximately 1 to 2 micrometers. The bridge member 22 is thus free from contact with the semiconductor plate 11 and thereby prevents the occurrence of thermal and mechanical stresses. The semiconductor plate 11 is thus protected from impairment due to such stresses and the zero component is stabilized.

Figure 2:
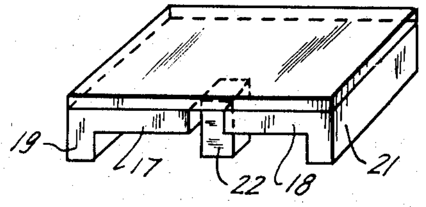
FIG. 2 is a perspective view of the spacer frame of FIG. 1 with a cover plate.

A cover plate 24 may be positioned on the spacer frame 17, as shown in FIG. 2. The cover plate 24 comprises a ferrite material and is positioned to cover the base portion 18 of the spacer frame 24 and to thereby completely cover the bridge member 22. The cover plate 24 may have the same dimensions as the carrier plate 16.

While the invention has been described by means of a specific example and in a specific embodiment, we do not wish to be limited thereto, for obvious modifications will occur to those skilled in the art without departing from the spirit and scope of the invention.

We claim:

1. A Hall device magnetic structure, comprising a carrier plate of ferrite material;

a Hall device positioned on said carrier plate, said Hall device having a semiconductor plate of high carrier mobility, current supply electrodes provided on said semiconductor plate and Hall voltage electrodes provided on said semiconductor plate;

a spacer frame of non-magnetic material which is a poor conductor of electricity affixed to said carrier plate in spaced relation with said Hall device; and a bridge member of ferromagnetic material supported by said spacer frame in operative proximity with but spaced by an air gap from said semiconductor plate for concentrating magnetic flux upon a surface of said semiconductor plate which is most effective for the Hall effect.

2. A Hall device magnetic structure as claimed in claim 1, wherein said bridge member comprises a ferrite.

3. A Hall device magnetic structure as claimed in claim 1, wherein said spacer frame comprises a sintered ceramic.

4. A Hall device magnetic structure as claimed in claim 1, wherein said spacer frame comprises aluminum oxide.

5. A Hall device magnetic structure as claimed in claim 1, wherein said carrier plate comprises sintered ceramic ferrite.

6. A Hall device magnetic structure as claimed in claim 1, wherein said spacer frame is of substantially U-shaped configuration and is affixed to said carrier plate in inverted position.

7. A Hall device magnetic structure as claimed in claim 1, further comprising a cover plate positioned on said spacer frame and completely covering said bridge member.

8. A Hall device magnetic structure as claimed in claim 7, wherein said cover plate comprises a ferrite.

9. A Hall device magnetic structure as claimed in claim 8, wherein said bridge member comprises a ferrite, said spacer frame is a sintered ceramic of substantially U-shaped configuration and is affixed to said carrier plate in inverted position and said carrier plate comprises sintered ceramic ferrite.

References Cited

UNITED STATES PATENTS

| | | | |
|---|---|---|---|
| 3,042,854 | 7/1962 | Maaz | 324—45 |
| 3,143,714 | 8/1964 | Evans et al. | 338—32 |
| 3,192,471 | 6/1965 | Kuhrt et al. | 338—32 |
| 3,226,657 | 12/1965 | Wiehl et al. | 324—45 |
| 3,265,959 | 8/1966 | Wiehl et al. | 338—32 |
| 3,315,204 | 4/1967 | Weiss | 338—32 |

RICHARD M. WOOD, *Primary Examiner.*

W. D. BROOKS, *Assistant Examiner.*